United States Patent
Chakraborty et al.

(10) Patent No.: US 11,651,380 B1
(45) Date of Patent: May 16, 2023

(54) REAL-TIME PROPENSITY PREDICTION USING AN ENSEMBLE OF LONG-TERM AND SHORT-TERM USER BEHAVIOR MODELS

(71) Applicant: INTUIT INC., Mountain View, CA (US)

(72) Inventors: Arnab Chakraborty, Bangalore (IN); Shrutendra Harsola, Bangalore (IN); Vikas Raturi, Bangalore (IN)

(73) Assignee: INTUIT INC., Mountain View, CA (US)

(*) Notice: Subject to any disclaimer, the term of this patent is extended or adjusted under 35 U.S.C. 154(b) by 0 days.

(21) Appl. No.: 17/657,305

(22) Filed: Mar. 30, 2022

(51) Int. Cl.
*G06Q 30/02* (2023.01)
*G06N 20/20* (2019.01)
*G06Q 30/0201* (2023.01)

(52) U.S. Cl.
CPC ......... *G06Q 30/0201* (2013.01); *G06N 20/20* (2019.01)

(58) Field of Classification Search
None
See application file for complete search history.

(56) References Cited

U.S. PATENT DOCUMENTS

| | | | | |
|---|---|---|---|---|
| 9,088,533 | B1* | 7/2015 | Zeng | H04L 51/234 |
| 2004/0158494 | A1* | 8/2004 | Suthar | G06Q 30/06 705/15 |
| 2013/0054306 | A1* | 2/2013 | Bhalla | G06Q 30/02 705/7.31 |
| 2014/0119522 | A1* | 5/2014 | Phadke | H04M 15/44 379/133 |
| 2016/0055160 | A1* | 2/2016 | Himel | G06F 16/248 707/728 |
| 2018/0218376 | A1* | 8/2018 | Shen | G06N 5/04 |
| 2019/0205905 | A1* | 7/2019 | Raghunathan | G06N 20/20 |
| 2020/0097981 | A1* | 3/2020 | Teo | G06N 20/00 |

FOREIGN PATENT DOCUMENTS

| | | | | |
|---|---|---|---|---|
| CN | 110222710 | A * | 9/2019 | G06K 9/6256 |
| CN | 112612920 | A * | 4/2021 | |
| WO | WO-2018201646 | A1 * | 11/2018 | G06F 30/10 |
| WO | WO-2020139344 | A1 * | 7/2020 | E21B 41/00 |

OTHER PUBLICATIONS

L. Yan, "Customer Behavior Prediction—It's all in the timing", Jan. 10, 2004, IEEE Potentials, vol. 23, Issue 4, pp. 20-25, abstract only. (Year: 2004).*

Jason R. Fitzsimmons, "Interaction Between Feasibility and Desirability in the Formation of Entrepreneurial Intentions", Jul. 2011, Journal of Business Venturing, vol. 26, Issue 4, pp. 431-440. (Year: 2011).*

(Continued)

*Primary Examiner* — Tan D Nguyen
(74) *Attorney, Agent, or Firm* — DLA Piper LLP (US)

(57) ABSTRACT

Systems and methods for real-time churn prediction using a flexible and robust machine learning system to predict user churn propensities in real-time using user activity data. In addition to churn propensity prediction, systems and methods may provide insights based on user activity data intelligence.

15 Claims, 8 Drawing Sheets

(56) References Cited

OTHER PUBLICATIONS

Jing Li, "Neural Attentive Session-Based Recommendation" Nov. 6-10, 2017, CIKM'17, pp. 1419-1428. (Year: 2017).*
Vishal Gupta, "A Survey of Text Mining Techniques and Applications," Aug. 2009, Journal of Emerging Tech in Web Intelligence, vol. 1, No. 1, pp. 60-76. (Year: 2009).*
Farzad Shafiei, "Multi-Enterprise Collaborative Enterprise Resource Planning and Decision Support Systems," 2004, IEEE, pp. 1-10. (Year: 2004).*

* cited by examiner

REAL-TIME PROPENSITY PREDICTION USING AN ENSEMBLE OF LONG-TERM AND SHORT-TERM USER BEHAVIOR MODELS

BACKGROUND

With the advancement of technology and software services, various service-based industries, especially software and technology companies, have seen a rapid rise in the implementation of subscription business models. The main objective for subscription business models is to maximize the lifetime value of a customer; therefore, customer retention is one of the most important focuses in Customer Relationship Management (CRM). CRM teams use many customer retention practices (e.g., discount offers, feature recommendations, etc.) to further this objective. However, these conventional customer retention practices rarely produce accurate and contextual usage intelligence, making it difficult for beneficial intervention practices to be successfully reproduced or customer churn (among other things) to be forecasted in advance.

DETAILED DESCRIPTION OF SEVERAL EMBODIMENTS

Embodiments of the present disclosure relate to systems and methods for real-time propensity predictions using an ensemble of long window and short window user behavior models. The implementation of this novel artificial intelligence and machine learning solution includes, in one respect, training a long window model on historical user product usage data and calculating a real-time long window propensity score for a particular user. The long window model analyzes the product usage data for a history window on the order of days (e.g., 7 days) and is configured to predict the user's propensity to perform an action (e.g., churn or use a product feature) within an upcoming twenty-four-hour rolling window. The disclosed solution further trains a short window model on recent user product usage data and calculates a real-time short window propensity score for the user. The short window model analyzes the product usage data for a shorter historical window on the order of hours (e.g., 1 hour). In addition, this solution implements a real-time ensemble model that combines the long window propensity score, the short window propensity score, and user profile information, to calculate a final propensity score.

In particular, the instant system and methods provide novel techniques for overcoming the deficiencies of conventional systems by identifying users with high risk of performing an action (e.g., churn) via artificial intelligence and machine learning models, as well as providing actionable insights and mitigation measures to reduce the likelihood of performing the action (e.g., churn).

Although the following description will be made with respect to churn propensity (e.g., propensity to cancel a subscription), it should be understood that this is a non-limiting example, and other types of propensity models for other user actions are applicable.

Figure 1:
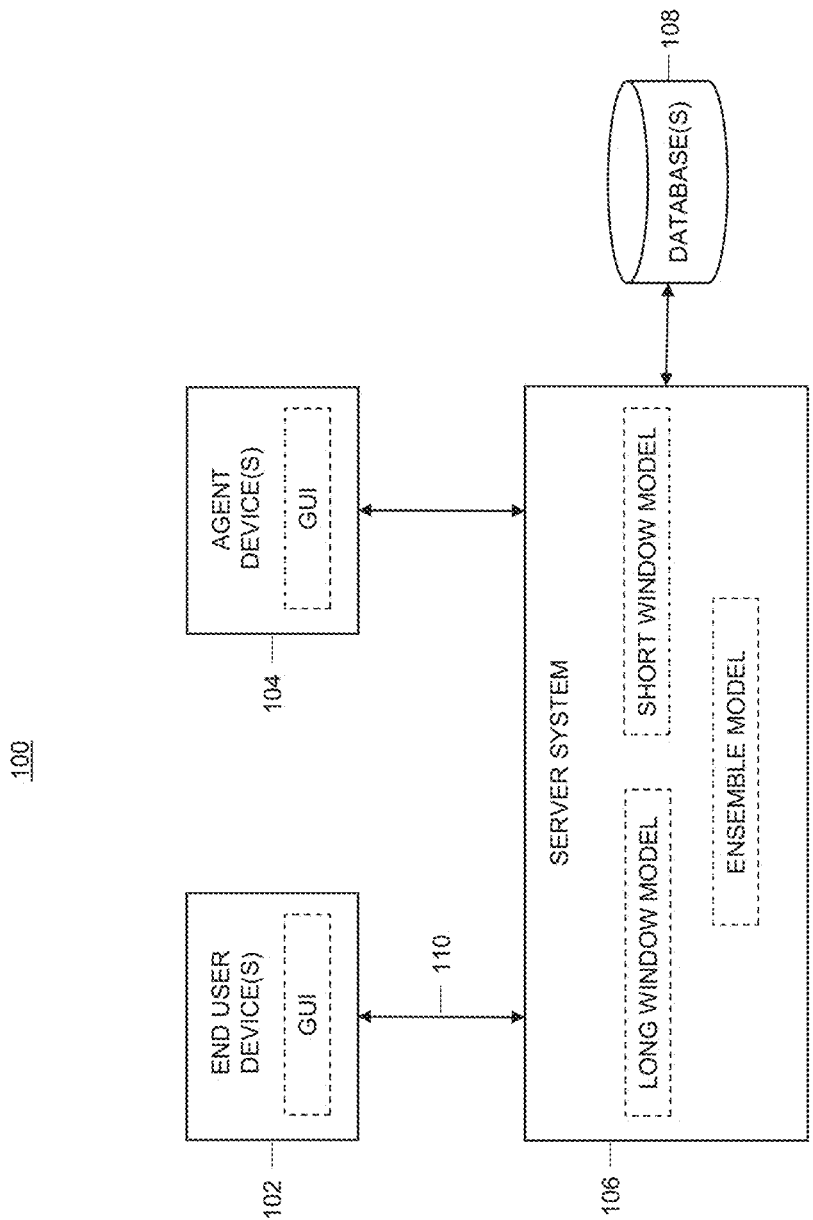
FIG. 1 illustrates a computing environment, according to various embodiments of the present disclosure.

Referring to FIG. 1, computing environment 100 can predict real-time churn or other user actions using an ensemble of long window and short window machine learning and artificial intelligence behavior models, according to embodiments of the present disclosure. Computing environment 100 may include one or more end user device(s) 102, one or more agent device(s) 104, a server system 106, and a database 108 communicatively coupled to the server system 106. End user device(s) 102, agent device(s) 104, server system 106, and database 108, are configured to communicate through network 110.

In one or more embodiments, each end user device(s) 102 is operated by a user. End user device(s) 102 may be representative of a mobile device, a tablet, a desktop computer, or any computing system having the capabilities described herein. Users may include, but are not limited to, individuals such as, for example, subscribers, customers, clients, or prospective clients, of an entity associated with server system 106, such as individuals who have obtained, will obtain, or may obtain a product, service, or consultation from an entity associated with server system 106.

End user device(s) 102 according to the present disclosure include, without limit, any combination of mobile phones, smart phones, tablet computers, laptop computers, desktop computers, server computers or any other computing device configured to capture, receive, store and/or disseminate any suitable data. In one embodiment, end user device(s) 102 includes a non-transitory memory, one or more processors including machine readable instructions, a communications interface that may be used to communicate with the server system (and, in some examples, with the database 108), a user input interface for inputting data and/or information to the user device and/or a user display interface for presenting data and/or information on the user device. In some examples, the user input interface and the user display interface are configured as an interactive graphical user interface (GUI). End user device(s) 102 are also configured to provide the server system 106, via the interactive GUI, with input information (e.g., user clickstreams from interacting with one or more products or services) for further processing. In some examples, the interactive GUI may be hosted by the server system 106 or it may be provided via a client application operating on the user device.

In one or more embodiments, each agent device(s) 104 is operated by a user under the supervision of the entity hosting and/or managing server system 106. Agent device(s) 104 may be representative of a mobile device, a tablet, a desktop computer, or any computing system having the capabilities described herein. Users of the agent device(s) 104 include, but are not limited to, individuals such as, for example, software engineers, database administrators, employees, and/or customer service agents, of an entity associated with server system 106.

Agent device(s) 10 according to the present disclosure include, without limit, any combination of mobile phones, smart phones, tablet computers, laptop computers, desktop computers, server computers or any other computing device configured to capture, receive, store and/or disseminate any suitable data. In one embodiment, each agent device(s) 104 includes a non-transitory memory, one or more processors including machine readable instructions, a communications interface that may be used to communicate with the server system (and, in some examples, with the database 108), a user input interface for inputting data and/or information to the user device and/or a user display interface for presenting data and/or information on the user device. In some examples, the user input interface and the user display interface are configured as an interactive GUI. The agent device(s) 104 are also configured to provide the server system 106, via the interactive GUI, input information (e.g., queries) for further processing. In some examples, the interactive GUI may be hosted by the server system 106 or it may be provided via a client application operating on the user device.

The server system 106 includes one or more processors, servers, databases, communication/traffic routers, non-transitory memory, modules, and interface components. In one or more embodiments, server system 106 hosts, stores, and operates a long window model, short window model, and ensemble model, to predict real-time churn of one or more users associated with end user device(s) 102. Server system 106 receives product usage data (e.g., click sequence data) associated with the one or more users, in response to an API call or automatically based on a predetermined recurring schedule. In response to receiving the product usage data, the server system 106 generates a long window model propensity score by evaluating the click sequence data based on a long window model. In one or more embodiments, the long window model is a machine learning model that may leverage training data comprising aggregated historical click sequence data associated with the one or more users as described in more detail below. Server system 106 may additionally generate a short window model propensity score by evaluating the click sequence data based on a short window model. In one or more embodiments, the short window model is a machine learning model that may leverage training data comprising recently aggregated sequence data associated with the one or more users as described in more detail below.

The server system 106 combines the long window model propensity score and short window model propensity score via an ensemble model. In one or more embodiments, the ensemble model combines the long window model propensity score and the short window model propensity score with profile information associated with the one or more users to generate a final propensity score. In addition, the server system 106, based on the final propensity score, identifies a set of products and/or service features where the one or more users need assistance and generates recommendations in the form of a set of one or more features the one or more users should engage with. A user interface presented to the one or more users can be modified to highlight or surface the recommended one or more features. In one or more embodiments, the server system 106 retrains one or more of the aforementioned models based on the determined propensity scores, the generated recommendations, and/or subsequent actions taken by the one or more users in response to receiving the recommendations.

Moreover, the server system 106 may include security components capable of monitoring user rights and privileges associated with initiating API requests for accessing the server system 106 and modifying data in the database 108. Accordingly, the server system 106 may be configured to manage user rights, manage access permissions, object permissions, and the like. The server system 106 may be further configured to implement two-factor authentication, secure sockets layer (SSL) protocols for encrypted communication sessions, biometric authentication, and token-based authentication.

Database 108 may be locally managed, or a cloud-based collection of organized data stored across one or more storage devices. The database 108 may be complex and developed using one or more design schema and modeling techniques. The database 108 may be hosted at one or more data centers operated by a cloud computing service provider. The database 108 may be geographically proximal to or remote from the server system 106 and is configured for data dictionary management, data storage management, multi-user access control, data integrity, backup and recovery management, database access language application programming interface (API) management, and the like. The database 108 is in communication with server system 106, end user device(s) 102, and agent device(s) 104, via network 110. The database 108 stores various data, including training data (e.g., user clickstream data) that can be modified and leveraged by server system 106, end user device(s) 102, and agent device(s) 104. Various data in the database 108 will be refined over time using a machine learning model, for example the machine learning models discussed with respect to FIGS. 2-5. Additionally, the database 108 may be deployed and maintained automatically by one or more components shown in FIG. 1.

Network 110 may be of any suitable type, including individual connections via the Internet, cellular or Wi-Fi networks. In some embodiments, network 110 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the Internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

In some embodiments, communication between the elements may be facilitated by one or more application programming interfaces (APIs). APIs of server system 106 may be proprietary and/or may be examples available to those of ordinary skill in the art such as Amazon® Web Services (AWS) APIs or the like.

Figure 2:
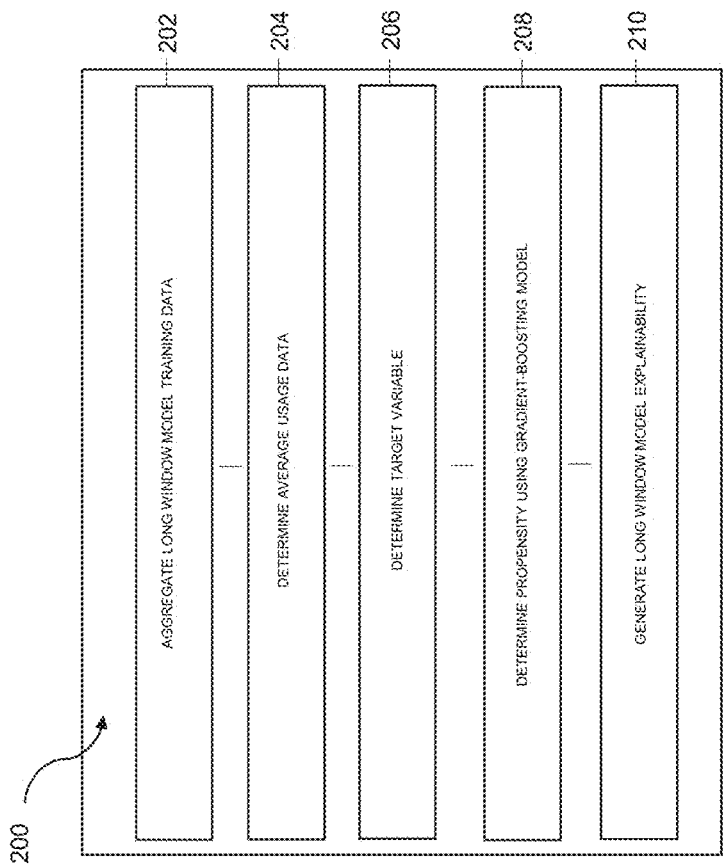
FIG. 2 illustrates a method of training a long window model, according to various embodiments of the present disclosure.

Referring to FIG. 2, a method of implementing a long window machine learning model (LWM) 200 is depicted, according to various embodiments of the present disclosure. At 202, server system 106 may continuously, and/or in response to an API call, initiate a process for training the long window model by aggregating long window training data, which in one or more embodiments includes historical product usage data associated with one or more user. For example, for a given reference date "D", the server system 106 may consider and train the long window model 200 on training data (e.g., product usage or click sequence data) within a predetermined range of days (D minus 175 days, D minus h), where "h" is lag. For example, server system 106 considers the click sequence events within the predetermined range of 175 days, but also incorporates the lag feature to ensure that the LWM is not highly sensitive to most recent click sequence events; this captures the user behavior over a longer historical window. Click sequence data includes user click events that occur when the user is interacting with the product. Click sequence data can also include, but is not limited to, the timestamp of the event and some other relevant information, for example, the country of accessing the product website, page URL, IP address, event description, and or device identifying information.

In some embodiments, the server system 106 parses the click sequence data to leverage a: (a) customer identifier; (b) click event; and (c) timestamp. In some embodiments, the customer identifier is a unique numerical identifier to join all the information for one user across multiple datasets. In some embodiments, the click event is a string describing the event that the user has performed in the product. Every action in the product has a unique click event string, (e.g., if the user clicks on the option for viewing the quick report for their account, the corresponding click event is denoted in path-like format indicating the series of pages visited or actions taken). Accordingly, the click event records the page hierarchy of the product as well as the actual event that happened. In some embodiments, the timestamp is a date/time field, which records the time at which the click event happened. This click sequence data is available in real-time through one or more sources including database 108.

At 204, server system 106 determines average usage data, which in one or more embodiments, includes the daily average number of clicks at various click points associated with the product usage of the one or more users over a predetermined period of time (e.g., 7 days). As there can be thousands of clicks for a single user in a 7 day period, the server system 106 converts the long list of clicks to a fixed dimensional feature vector by computing a daily average count of clicks over a set of most frequently occurred click events across the entire dataset. The feature vector of LWM for the $i^{th}$ customer at a reference time point t is defined as:

$$X_i^{(l)}(t) = (c_1(t), \ldots, c_m(t), C(t)),$$

where, $c_j(t)$ is the daily average counts of click event j, and $C(t)$ is the daily average total counts of click events over a period of (t−7 days, t−h). $j \in \{1, \ldots, m\}$ denotes the most frequent click events across the entire dataset. In contrast to conventional techniques, the advantage of this approach is at least three-fold. For example (1) this approach can easily be performed at scale using count vectorizer operation, (2) the length of the feature vector is uniform across multiple observations and hence easy to use in numerous machine learning classifiers, and (3) the daily average click counts are comparable across users (e.g., subscribers and/or customers) at different stages of their subscription tenures in using the product, despite the total count of each user potentially being significantly different if the user's tenure is less than 7 days at computation time.

At 206, server system 106 determines a target variable associated with the churn/user action of the one or more users operating end user device(s) 102. The target is a binary outcome variable. The target equates to '1' if the user (e.g., customer or subscriber) has churned (or performed some other monitored action) within 24 hours of the given reference date "D" and '0' if the has user not churned (or performed some other monitored action). The server system 106 leverages a sliding-box method to determine the target variable. In one embodiment, given a reference time point t for the $i^{th}$ customer, the target variable $Y_i(t)$ is defined as follows:

$$Y_i(t) = \begin{cases} 1 \\ 0 \end{cases}$$

if the $i^{th}$ customer churns within $(t, t+\delta]$, otherwise, where, sliding-box $\delta$ (>0)) is a pre-defined time-window.

The sliding-box method allows the target variable to change over time and provides considerable flexibility for modeling given that the length of the box is a pre-defined period of time (e.g., 24 hours).

In some embodiments, the LWM serves the purpose of estimating the propensity of churn (or any other event) in real-time, the reference time points for computing the target and features can be continuous and hence, even though discretized (e.g., daily reference time points), the training dataset for many users can be huge. To address the potential for generating too large of a dataset, this model also includes a time series block bootstrap based downsampling, which accurately captures a temporal pattern of the dataset.

At 208, the server system 106 determines propensity using a gradient-boosting model (GBM) to model the churn (or other monitored action) propensity of a user at a given reference time point. For example, the GBM applies a combination of machine learning techniques, such as an ensemble of decision trees and boosting, to classify whether the user is likely to churn and calculate a propensity score. In some embodiments, the GBM may fit the decision tree on parts of the training data and calculate the loss. The GBM then finds another decision tree which resembles the gradient of the loss (e.g., in terms of squared error loss) and adds that with the previous tree. In training, the GBM may repeat these steps until overfitting occurs or the residuals become constant. Although, in the instant embodiment, the GBM has been used a binary classifier to train the long window model in batch mode, other classifiers such as random forest, logistic regression and neural network models can also be trained in the similar fashion. Next, the GBM may train with batch models, such as binary classifiers (e.g., Batch-Random Forest, Batch-Logistic Regression, and Batch-Feed forward Neural Network). Moreover, the GBM may have hyperparameters tuned to maximize a five-fold stratified cross-validation receiver operating characteristic (ROC)-area under the curve (AUC) (e.g., [n_estimator=500, learning_rate=0.01, max_depth=3, max_features='sqrt', subsample=0.8]). As will be discussed below with reference to FIGS. 4 and 5, the propensity score calculated by the GBM is ultimately transmitted to the ensemble model as an input.

At 210, server system 106 generates an LWM explainability output. For example, server system 106 may train a Shapley Additive Explanations (SHAP) explainer on the training and backtesting of the long window model dataset. Then for each of the inference cases, the SHAP explainer shows the contribution of each of the features for that particular inferred churn risk score. The sign of the SHAP value for a feature being positive or negative denotes whether that feature has contributed to an increase or decrease in the churn propensity of the inference case. Moreover, the SHAP explainer indicates whether the corresponding feature value for the inference case is 'high' or 'low' by comparing them with the population average (computed from the data on which the explainer has been trained). The features may be the daily average count of clicks at certain click points in the product for the long window model, as such, server system 106 can confidently associate the feature contribution insights from the SHAP explainer to the corresponding feature in the product. For example, if the feature (e.g., daily average count in last week) corresponding to a specific product feature (e.g., an account settings help text feature) is high, and the corresponding SHAP value is significantly positive, the explainability data can include actionable insights regarding reasons of churn (e.g., the user needs help with setting their accounts), and the same can be automatically provided (e.g., in the form of a: report, notification, or real-time intervention task) to the CRM team as an insight into the product feature and reason the customer has or may churn (or perform another monitored action).

In some embodiments, the training data processing (Extract, Transform, and Load (ETL)), model building, validation, and inference for the LWM model occurs through a daily batch pipeline. This batch pipeline puts the inference data and other artifacts into an online feature store with low latency to be used in the online inference discussed below.

Figure 3:
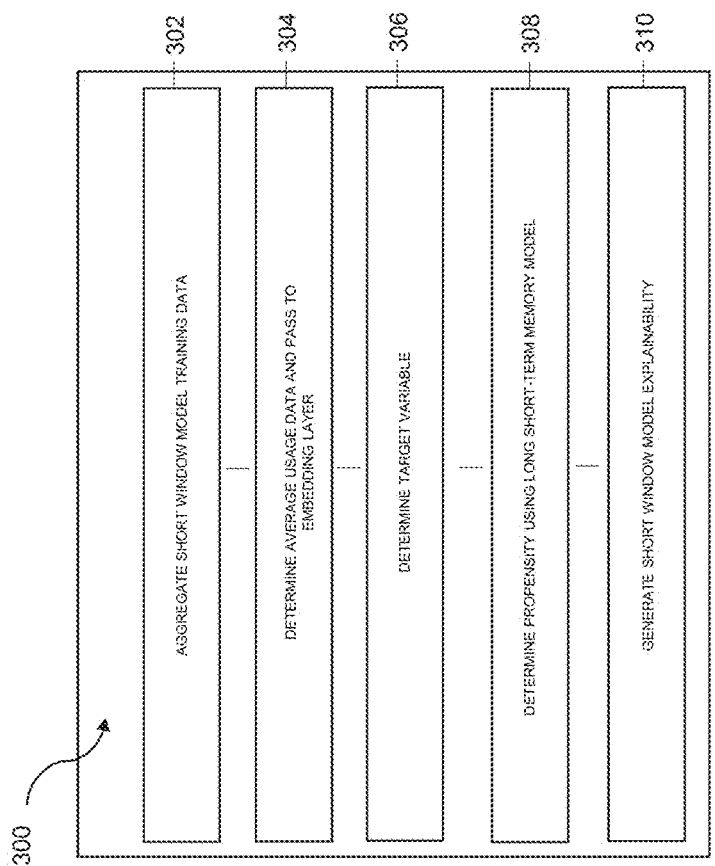
FIG. 3 illustrates a method of training a short window model, according to various embodiments of the present disclosure.

Referring to FIG. 3, a method for implementing a short window machine learning model (SWM) 300 is depicted, according to various embodiments of the present disclosure. At 302, server system 106 may train a short window model in batch mode (e.g., daily) by curating training data, which in one or more embodiments includes recent product usage data associated with one or more user. For example, the training data includes click sequence data in its rawest form, that is, click sequence data generated from user activity within the last hour (or another short and recent period of time, e.g., 24 hours). The server system 106 considers the click sequence events within the predetermined range of one hour.

In some embodiments, the server system 106 parses the click sequence data to leverage a: (a) customer identifier; (b) click event; and (c) timestamp.

At 304, server system 106 determines the correct machine-understandable representation (e.g., tokenizing and padding) of usage data and passes it to the embedding layer by leveraging the recent click sequence data as feature a vector. In one embodiment, the feature of SWM is:

$$X_i^{(s)}(t) = (e(t_1), \ldots, e(t_{ki})),$$

where (t−1 hour)$\leq t_1 < t_2 < \ldots < t_{ki} \leq t$ are timestamps at which the click sequence events ({e(t)}) occurred. The length of this feature vector can be anything between 1 and a few hundred hours. As the elements of this feature vector are not numeric in nature, server system 106 may use this feature vector along with a tokenizer and padding before passing it to a sequence model with embedding and trainable weights.

At 306, server system 106 determines a target variable associated with the churn (or other monitored action) of the one or more users operating end user device(s) 102. The target variable is a binary outcome variable. The target equates to '1' if the user (e.g., customer/subscriber) has, for example, churned within 24 hours of the given reference date "D" and '0' if the has user not churned. The server system 106 leverages a sliding-box method to determine the target variable. In some embodiments, given a reference time point t for the $i^{th}$ customer, target variable $Y_i(t)$ is defined as follows:

$$Y_i(t) = \begin{cases} 1 \\ 0 \end{cases}$$

customer churns within (t, t+δ], otherwise, where, sliding-box δ (>0)) is a pre-defined time-window.

In some embodiments, the SWM serves the purpose of estimating the propensity of churn or any other event in real-time, the reference time points for computing the target and features can be continuous and hence, even though discretized (e.g., hourly reference time points), the training dataset for many users can be huge. To address the potential for generating too large of a dataset, this model also includes a time series block bootstrap based downsampling, which accurately captures a temporal pattern of the dataset.

At 308, server system 106 determines propensity using one or more long short-term memory (LSTM) models. Here, the model may be pre-trained in batch mode and the featurization for inference cases happens online in real-time. The inference data for this model includes datasets that are continuously updated and available in real-time. In some embodiments, server system 106 uses a sequence model to estimate the propensity of churn from the recent sequence of clicks. In one instance, the sequence model for analyzing the short window user behavior includes an embedding layer with trainable weights, followed by two Bidirectional LSTM (BiLSTM) layers, spatial drop-out layers, and a two layer feed forward network with Rectified Liner Unit (ReLu) activation. The model weights, including the embedding layer, are estimated by minimizing binary cross-entropy loss using an Adaptive Moment Estimation (ADAM) optimizer with a learning rate similar to 0.001. To address the potential imbalance of the data, an additional class weight (e.g., five times the weight) may be assigned on the positive classes during training. As will be discussed below with reference to FIGS. 4 and 5, the propensity score calculated by the LSTM is ultimately transmitted to the ensemble model where it is used as an input.

At 310, server system 106 generates an SWM explainability output. For example, the server system 106 generates SWM explainability by backtesting the LSTM model on test data. In some embodiments, the server system 106 compares the frequency distribution of click events for high churn propensity cases (top decile ranked by descending order by churn probability) to low propensity cases (rest of the deciles), based on a predetermined threshold. The list of click events for which the marginal proportion of occurrence is significantly different between high and low groups, forms the candidate event set for the SWM explainability output. During the real-time inference, the most recent event from the candidate set is passed as an explainability insight from the SWM to the to the Customer Relationship Management (CRM), for example, in the form of a report, a notification, or a real-time intervention task.

In some embodiments, the training data processing (Extract, Transform, and Load (ETL)), model building, and validation, for the SWM occurs through a daily batch pipeline. This batch pipeline puts the SWM and other artifacts (e.g., pre-processor, tokenizer, padder, explainability dictionary etc.) into an online feature store with low latency to be used in the online inference discussed below.

Figure 4:
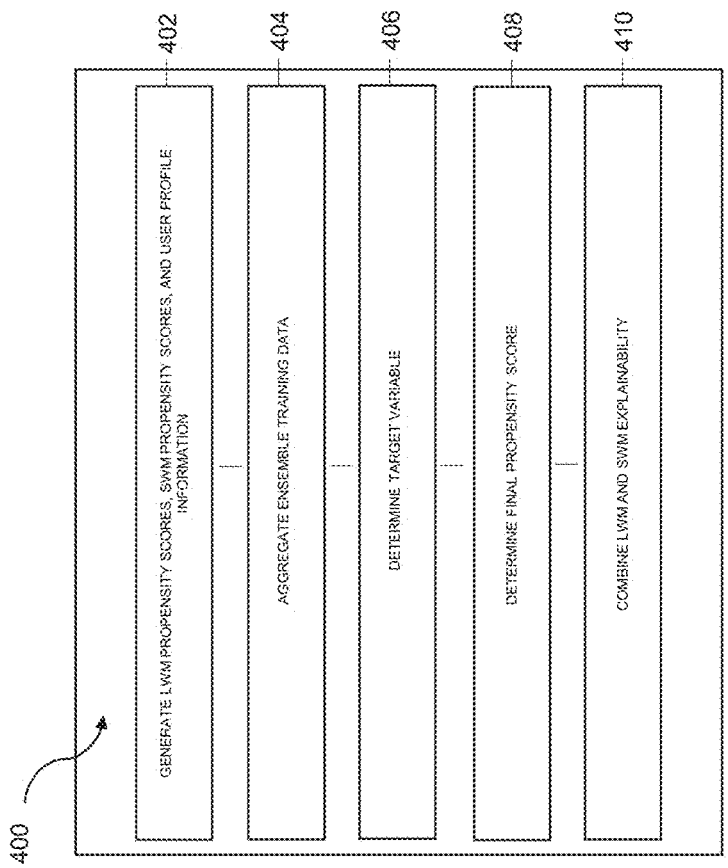
FIG. 4 illustrates a method of training an ensemble model, according to various embodiments of the present disclosure.

Referring to FIG. 4, a method for implementing an ensemble machine learning model 400 is depicted, according to various embodiments of the present disclosure. The ensemble machine learning model is a supervised binary classification model. The LWM and SWM model propensity scores are used as primary features for the ensemble machine learning model 400. In addition to the LWM and SWM model propensity scores, the server system 106 also includes the customer profile information, for example, the type of the customer, age of the customer, and the channels through the customer onboarded, as features for the ensemble machine learning model 400.

At 402 the long window propensity score and short window propensity score may be passed and used as primary features for the ensemble machine learning model 400.

At 404 the long window model propensity scores and short window model propensity scores are converted to negative log scale and then to higher order powers before feeding to the ensemble model. In addition, server system 106 also includes the customer profile information (e.g., the type of customer, age of the customer, and the channels through the customer onboarded, etc.), as features for the ensemble machine learning model 400. The long window model propensity scores, short window model propensity scores, and customer profile information, are aggregated over multiple reference time-points to compute the training data for ensemble model 400. At 406, server system 106 may determine the target variable using a sliding-box method as described above. At 408, server system 106 may use a regularized logistic regression model with L1 penalty, which adds a penalty term based on an absolute value of the model parameters, to determine a final propensity score. At 410, the server system 106 combines the explainability output received from LWM and SWM to compose a final explainability output to be forwarded to the agent device(s) 104.

In some embodiments, the training data processing (Extract, Transform, and Load (ETL)), model building and validation for the ensemble model occurs through a daily batch pipeline. This batch pipeline puts the ensemble model and other artifacts (e.g., model object, one-hot encoder etc.) into an online feature store with low latency to be used in the online inference discussed below.

Figure 5:
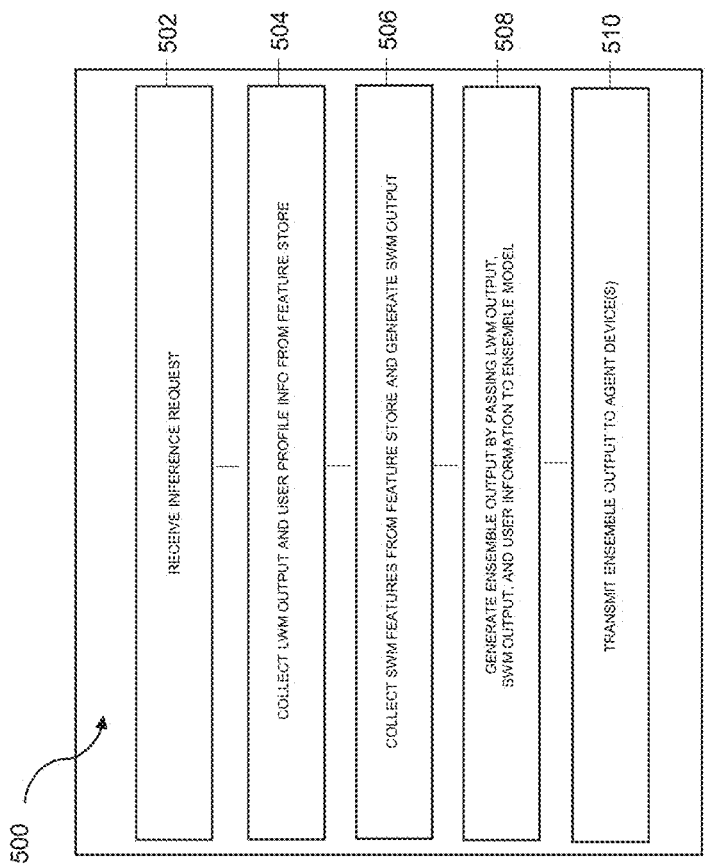
FIG. 5 illustrates a method of online inference, according to various embodiments of the present disclosure.

Referring to FIG. 5 a method of real-time or online inference 500 is depicted. In some embodiments, server system 106 periodically aggregates and populates an online inference layer, which in one non-limiting embodiment, includes a pull-based trigger system, a stream processing platform and an online inference layer. The pull-based trigger system starts processing in response to an API call/request 502.

At 504, the LWM propensity scores and explainability outputs from previous day batch run are fetched from a low latency feature store in near real-time to be leveraged by the ensemble model.

At 506, the server system 106 periodically (e.g., every few hours) updates with recent click sequence data in feature store that may be leveraged by the SWM to compute the SWM propensity score and the explainability output.

At 508, the LWM and SWM outputs are passed to the ensemble model to get the final ensemble churn propensity score and the ensemble explainability output. The combination of the ensemble propensity score and ensemble explainability outputs results in one or more users being classified with a 'High' or 'Low' risk of churn depending on a threshold. The threshold is chosen based on back-testing results using a previous month's churn data in such a way that only a top percentage (e.g., 10%) of the users are classified as 'High' risk. Users identified as 'High' risk may be flagged as requiring intervention and automatically prompted with relevant intervention measures previously identified as preventing churn in similarly situated users. At 510, these outputs (e.g., the ensemble propensity score and the ensemble explainability output) are passed to agent device(s) 104.

Figure 6:
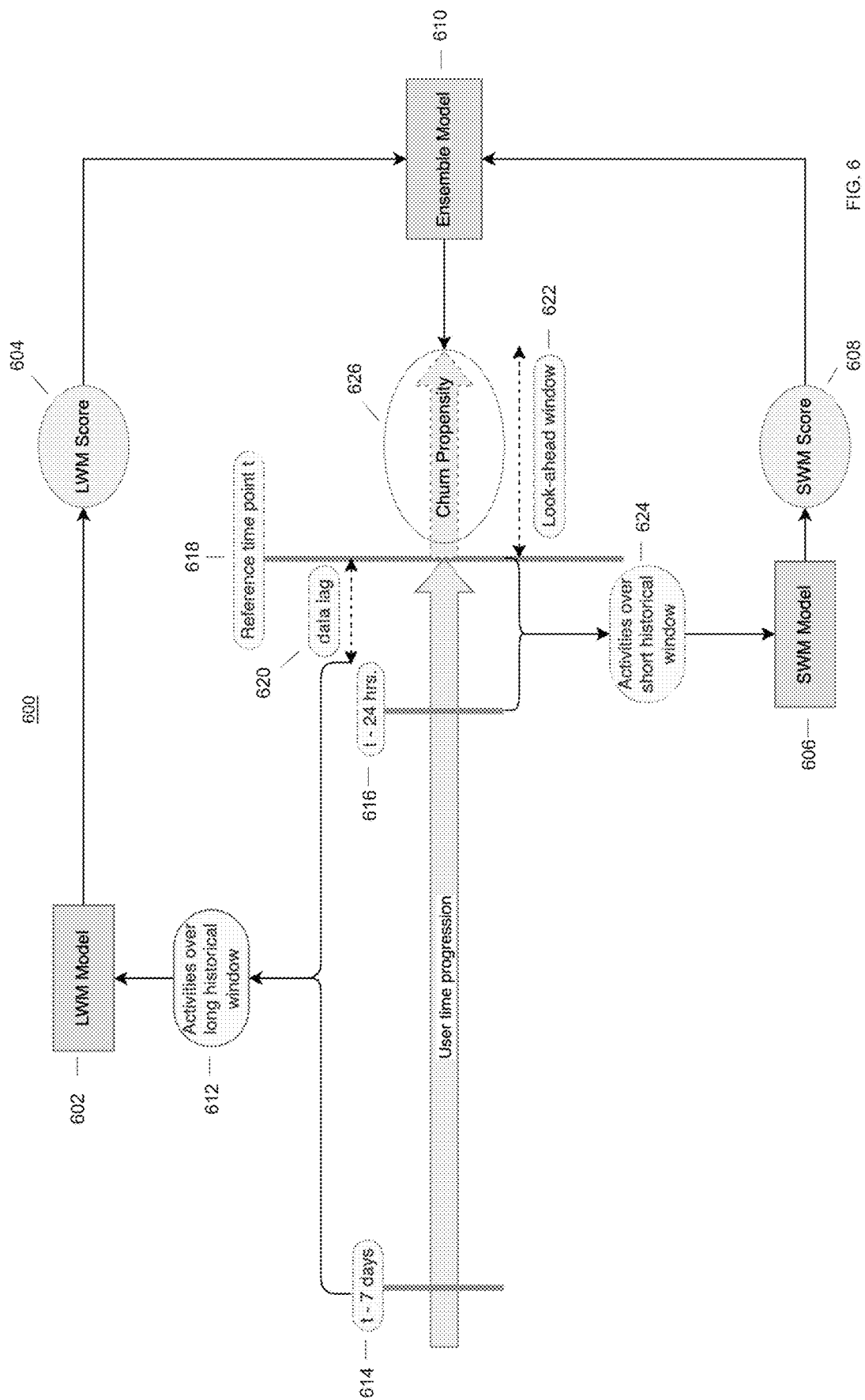
FIG. 6 illustrates an architectural workflow diagram for predicting real-time propensity, according to various embodiments of the present disclosure.

Referring to FIG. 6, an architectural workflow 600 diagram for predicting real-time churn propensity according to various embodiments of the present disclosure is depicted. While FIG. 6 is directed to predicting churn propensity, it should be appreciated that the architectural workflow 600 could be used for other monitored user actions (e.g., user interactions with a particular product or service). As shown in FIG. 6, the architectural workflow 600 includes the three machine learning components previously discussed in FIGS. 2-5: a long window model (LWM) 602, short window model (SWM) 606, and an ensemble model 610, which combines the SWM and LWM model outputs to generate a final ensemble churn propensity score 626.

In some embodiments, user activities over a long historical window 612 are fed into the long window model 602. The long window model 602 automatically generates a long window model propensity score 604 that is fed into the ensemble model 610. This may occur automatically and on an ongoing basis. The user activities long historical window 612 may be aggregated and represents user activity from a predetermined period of time, for example from time period ranging from t minus 7 days 614 to t, wherein t is a specific reference time point 618, (i.e., a specific point in time that is referenced). In parallel and/or according to a predetermined schedule, short window model 606 is fed user activities over a short historical window 624, and automatically generates a short window model propensity score 608 that is fed into the ensemble model 610. The activities over a short historical window 624 may be aggregated and represent user activity from a predetermined recent period of time, for example from a time period ranging from t minus 24 hours 616, wherein 't' is a specific Reference Time Point 618. In some instances, the long window model 602 may be subject to an intentional data lag 620, which ensures that neither model is influenced by the data lag present in the data stored in database 108. Using the long window model propensity score 604 and short window model propensity score 608, the ensemble model 610 calculates a final ensemble churn propensity score 626. The final ensemble churn propensity score 626 is estimated, which indicates the likelihood of churn of the user in the look-ahead window 622 (e.g., 24 hours in the future, which is a configurable lookahead parameter that indicates the number of time steps ahead to predict).

Figure 7:
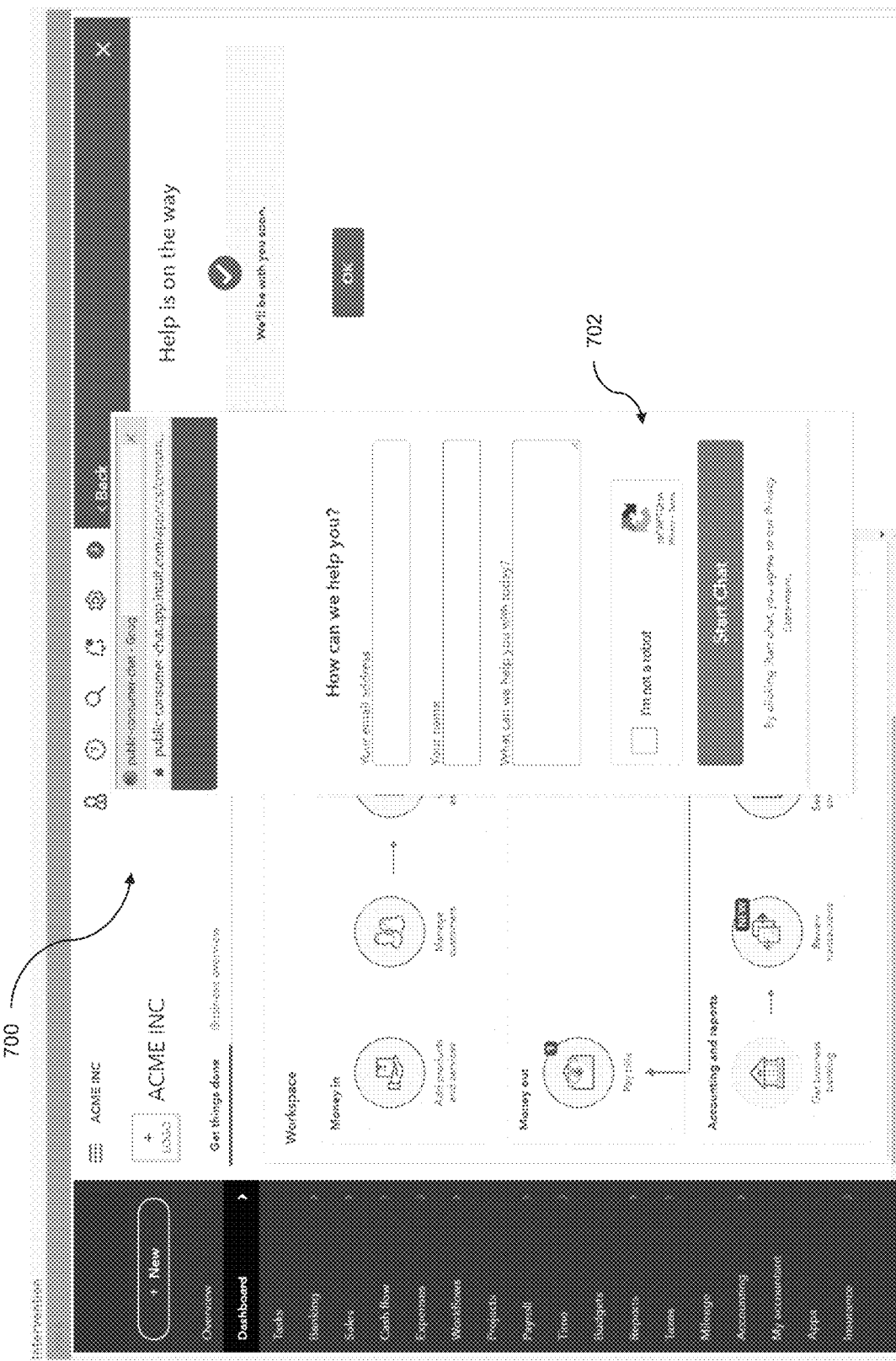
FIG. 7 illustrates a graphical user interface for real-time customer intervention, according to example embodiments of the present disclosure.

Referring to FIG. 7, a graphical user interface (GUI) 700 for real-time customer intervention, according to example embodiments of the present disclosure is depicted. In furtherance of leveraging the explainability output and final ensemble churn propensity score that is created by the ensemble model 610, server system 106 may generate and provide relevant tasks meant to prevent churn to users identified as having a 'High' risk of churn. In some embodiments, users identified as having a high risk of churn receive one or more relevant tasks (e.g., pop-up window, tutorial, invitation to contact a customer relationship manager) in real-time designed to improve their experience with a product. The relevant task(s) may be pushed from server system 106 to the user's end user device(s) 102 as they are using the product in real-time. For example, while the user is interacting with the service or product on GUI 700, server system 106 may push one or more relevant task(s) to be displayed on GUI 700. In response to determining that the user is at 'High' risk for churn, server system 106 may push intervening relevant task 702 to end user device(s) 102 via GUI 700.

In another embodiment, GUI 700 is utilized by one or more customer relationship manager(s) (e.g., agent(s)) operating agent device(s) 104. For example, server system 106 may be integrated with or include a product intervention platform to run large scale retention campaigns with real-time, contextual, and proactive interventions. In some embodiments, a customer relationship manager may initiate using agent device(s) 104 an API call to server system 106 requesting insight regarding churn or any other event at the time of assisting the user. In response to this request, server system 106 may prompt the ensemble (machine learning) model to generate a final ensemble churn propensity score and ensemble explainability output data. In another embodiment, server system 106 may continuously or based on some usage-based business logic compute the final ensemble churn propensity, and if that is 'High' based on threshold, server system 106 may send a help request to user device(s) 102 for assisting the customer with the product. Server system 106 may prompt the user (e.g., with a relevant task in the form of prompt), via user device(s) 102, for relevant contact details of the user. The user's relevant contact details may be forwarded to agent device(s) 104 so that an agent on the CRM team can assist the user.

Notably, this solution evaluates propensity for churn in real-time and may implement one or more processes in response to an occurring event (e.g., an event-based trigger). Accordingly, in some embodiments either the user or customer relationship manager (or both) may receive an intervening relevant task 702 from server system 106 in response to a determination that a user has a high propensity of churning. In this instance, server system 106 may push an appropriate intervening relevant task 702 to end user device(s) and/or the agent device(s) via GUI 700.

Figure 8:
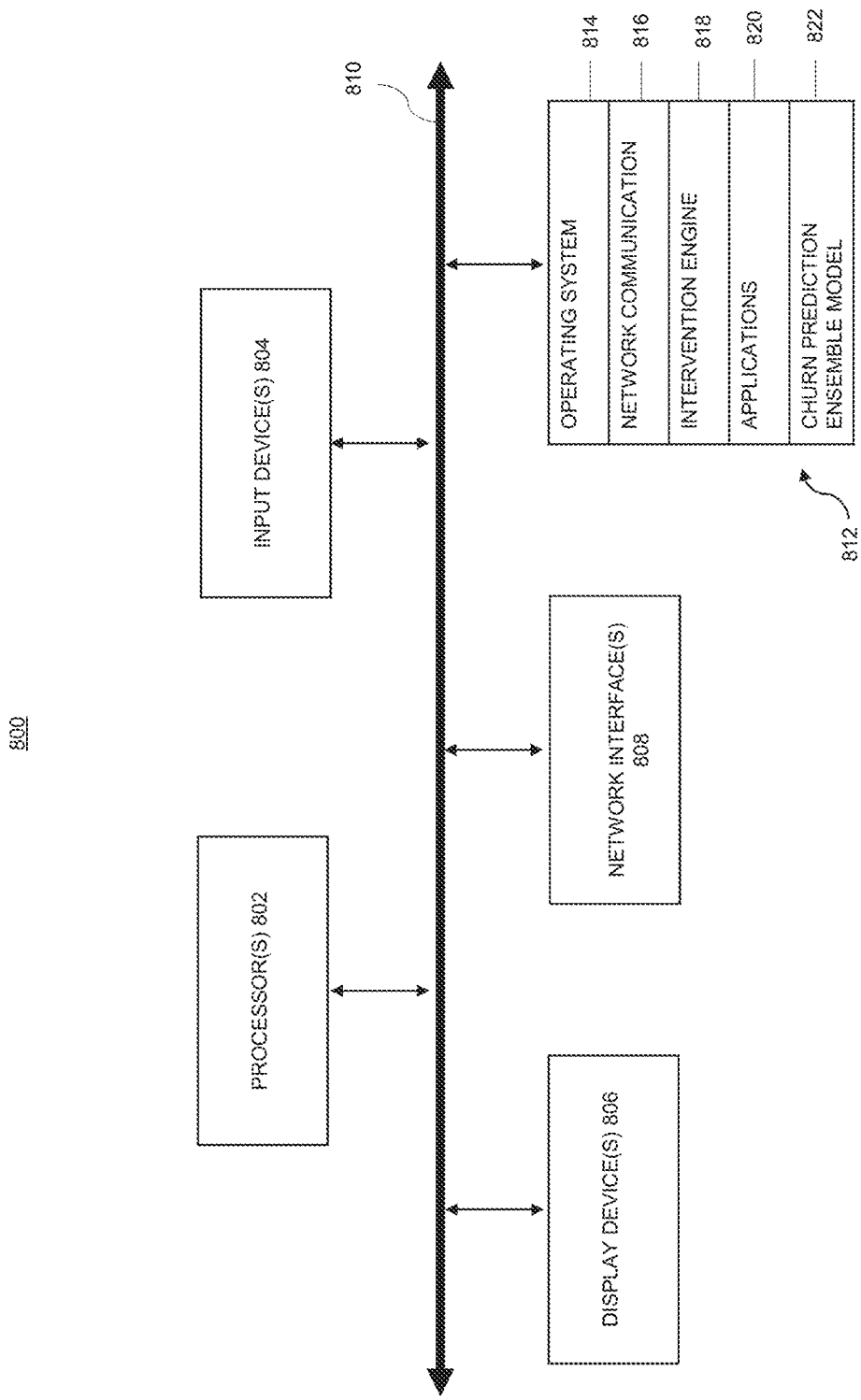
FIG. 8 illustrates a block diagram for a computing device, according to various embodiments of the present disclosure.

FIG. 8 illustrates a block diagram for a computing device, according to various embodiments of the present disclosure. For example, computing device 800 may function as server system 106. The computing device 800 may include a service that provides automatic feedback generation functionality as described above or a portion or combination thereof in some embodiments. The computing device 800 may be implemented on any electronic device that runs software applications derived from compiled instructions, including without limitation personal computers, servers, smart phones, media players, electronic tablets, game consoles, email devices, etc. In some implementations, the computing device 800 may include processor(s) 802, (one or more) input device(s) 804, one or more display device(s) 806, one or more network interfaces 808, and one or more computer-readable medium(s) 812 storing software instructions. Each of these components may be coupled by bus 810, and in some embodiments, these components may be distributed among multiple physical locations and coupled by a network 110.

Display device(s) 806 may be any known display technology, including but not limited to display devices using Liquid Crystal Display (LCD) or Light Emitting Diode (LED) technology. Processor(s) 802 may use any known processor technology, including but not limited to graphics processors and multi-core processors. Input device(s) 804 may be any known input device technology, including but not limited to a keyboard (including a virtual keyboard), mouse, track ball, camera, and touch-sensitive pad or display. Bus 810 may be any known internal or external bus technology, including but not limited to ISA, EISA, PCI, PCI Express, USB, Serial ATA or FireWire. Computer-readable medium(s) 812 may be any non-transitory medium that participates in providing instructions to processor(s) 802 for execution, including without limitation, non-volatile storage media (e.g., optical disks, magnetic disks, flash drives, etc.), or volatile media (e.g., SDRAM, ROM, etc.).

Computer-readable medium(s) 812 may include various instructions for implementing an operating system 814 (e.g., Mac OS®, Windows®, Linux). The operating system may be multi-user, multiprocessing, multitasking, multithreading, real-time, and the like. The operating system may perform basic tasks, including but not limited to: recognizing input from input device(s) 804; sending output to display device(s) 806; keeping track of files and directories on computer-readable medium(s) 812; controlling peripheral devices (e.g., disk drives, printers, etc.) which can be controlled directly or through an I/O controller; and managing traffic on bus 810. Network communications instructions 816 may establish and maintain network connections (e.g., software for implementing communication protocols, such as TCP/IP, HTTP, Ethernet, telephony, etc.).

Intervention engine 818 may include instructions that enable computing device 800 to implement one or more methods as described herein. Application(s) 820 may be an application that uses or implements the processes described herein and/or other processes. The processes may also be implemented in operating system 814. For example, application(s) 820 and/or operating system 814 may execute one or more operations to monitor user interaction with an application and automatically generate user feedback based on the monitored user interaction on the interactive GUI 700.

Churn predication ensemble Model 822 may be used in conjunction with one or more methods as described above. Input (e.g., click sequence data and LWM and SWM propensity score) received at computing device 800 may be fed into a churn prediction ensemble model 822 to predict user churn and populate intervention recommendation. Additionally, user product usage data (e.g., click sequence data) may be fed into the churn prediction ensemble model 822 to train the churn prediction ensemble model 822 to identify events and features that may cause churn.

The described features may be implemented in one or more computer programs that may be executable on a programmable system including at least one programmable processor coupled to receive data and instructions from, and to transmit data and instructions to a data storage system (e.g., database 108), at least one input device, and at least one output device. A computer program is a set of instructions that can be used, directly or indirectly, in a computer to perform a certain activity or bring about a certain result. A computer program may be written in any form of programming language (e.g., Sandbox, SQL, Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

It is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A computer-implemented method for automatically evaluating churn propensity for one or more users comprising:
    receiving click sequence data associated with one or more users;
    generating a long window model propensity score by evaluating the click sequence data based on a long window model;
    determining a machine-understandable representation of the click sequence data by converting the click sequence data into a vector;
    generating a short window model propensity score by evaluating the vector based on a short window model;
    evaluating the long window model propensity score and the short window model propensity score by an ensemble model, wherein the ensemble model combines the long window model propensity score and the short window model propensity score and generates an explainability output;
    generating a final churn propensity score for the one or more users based on the evaluation by the ensemble model; and
    modifying a graphical user interface on a user device with an intervening prompt, in response to the explainability output.

2. The computer-implemented of claim 1, wherein the long window model includes leveraging a count vectorizer that converts the click sequence data to a fixed dimensional feature vector.

3. The computer-implemented of claim 1, wherein the click sequence data is used as training data to train the long window model; and wherein a feed for receiving the training data is subject to an intentional lag.

4. The computer-implemented of claim 1, wherein the click sequence data is used as training data to train the short window model; and wherein the click sequence data includes information related to one or more of: a timestamp, IP address, and event description.

5. The computer-implemented of claim 1, wherein the one or more users with a final churn propensity score meeting or exceeding a predetermined threshold are classified as having a high churn potential.

6. A computer-implemented method for automatically evaluating churn propensity for one or more users comprising:
receiving click sequence data associated with one or more users;
generating a long window model propensity score by evaluating the click sequence data based on a long window model, wherein the long window model includes aggregated historical click sequence data associated with the one or more users;
determining a machine-understandable representation of the click sequence data by converting the click sequence data into a vector;
generating a short window model propensity score by evaluating the vector based on a short window model, wherein the short window model includes a temporal pattern of recent click sequence data associated with the one or more users;
evaluating the long window model propensity score and the short window model propensity score by an ensemble model, wherein the ensemble model combines the long window model propensity score and the short window model propensity score with profile information associated with the one or more users;
generating an explainability output and a final churn propensity score for the one or more users based on the evaluation by the ensemble model; and
modifying a graphical user interface on a user device with an intervening prompt, in response to the explainability output.

7. The computer-implemented of claim 6, wherein the long window model includes leveraging a count vectorizer that converts the aggregated historical click sequence data to a fixed dimensional feature vector.

8. The computer-implemented of claim 6, wherein the aggregated historical click sequence data is used as training data to train the long window model; and wherein a feed for receiving the training data is subject to an intentional lag.

9. The computer-implemented of claim 6, wherein the recent click sequence data is used as training data to train the short window model; and wherein the recent click sequence data includes information related to one or more of: a timestamp, IP address, and event description.

10. The computer-implemented of claim 6, wherein the one or more users with a final churn propensity score meeting or exceeding a predetermined threshold are classified as having high churn potential.

11. A system for automatically evaluating propensity for one or more users comprising:
a server comprising one or more processors; and
a non-transitory memory, in communication with the server, storing instructions that when executed by the one or more processors, causes the one or more processors to implement a method comprising:
receiving click sequence data associated with one or more users;
generating a long window model propensity score by evaluating the click sequence data based on a long window model, wherein the long window model includes aggregated historical click sequence data associated with the one or more users;
determining a vector that is a machine-understandable representation of the click sequence data by converting the click sequence data into the vector;
generating a short window model propensity score by evaluating the vector based on a short window model, wherein the short window model includes a temporal pattern of recent click sequence data associated with the one or more users;
evaluating the long window model propensity score and the short window model propensity score using an ensemble model, wherein the ensemble model combines the long window model propensity score and the short window model propensity score with profile information associated with the one or more users and generates an explainability output; and
generating a final propensity score for the one or more users based on the evaluation by the ensemble model;
wherein the one or more processors are further configured to modify a graphical user interface on a user device with an intervening prompt, in response to the explainability output.

12. The system of claim 11, wherein the long window model includes leveraging a count vectorizer that converts the aggregated historical click sequence data to a fixed dimensional feature vector.

13. The system of claim 11, wherein the aggregated historical click sequence data is used as training data to train the long window model; and wherein a feed for receiving the training data is subject to an intentional lag.

14. The system of claim 11, wherein the recent click sequence data is used as training data to train the short window model; and wherein the recent click sequence data includes information related to one or more of: a timestamp, IP address, and event description.

15. The system of claim 11, wherein propensity score is associated with a churn propensity and the one or more users with a final propensity score exceeding a predetermined threshold are classified as having a high churn potential.

* * * * *